March 3, 1953　　　　　　A. S. PAGE　　　　　2,630,331
SHAFT MOUNTING BRACKET FOR HEAVY VEHICLES
Filed Sept. 17, 1951　　　　　　　　　　2 SHEETS—SHEET 1
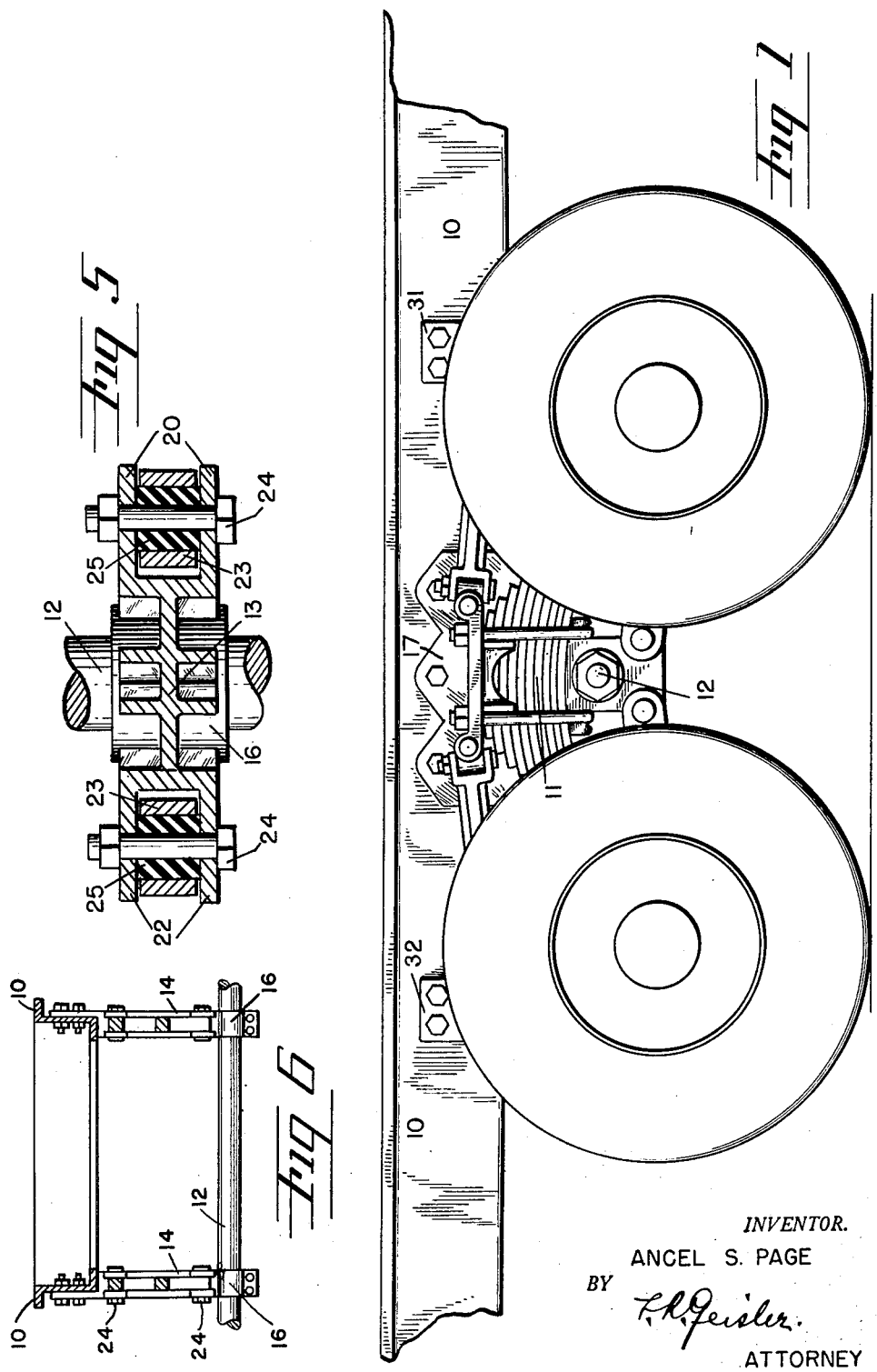
INVENTOR.
ANCEL S. PAGE
BY
*F. R. Geisler*
ATTORNEY March 3, 1953 A. S. PAGE 2,630,331
SHAFT MOUNTING BRACKET FOR HEAVY VEHICLES
Filed Sept. 17, 1951 2 SHEETS—SHEET 2
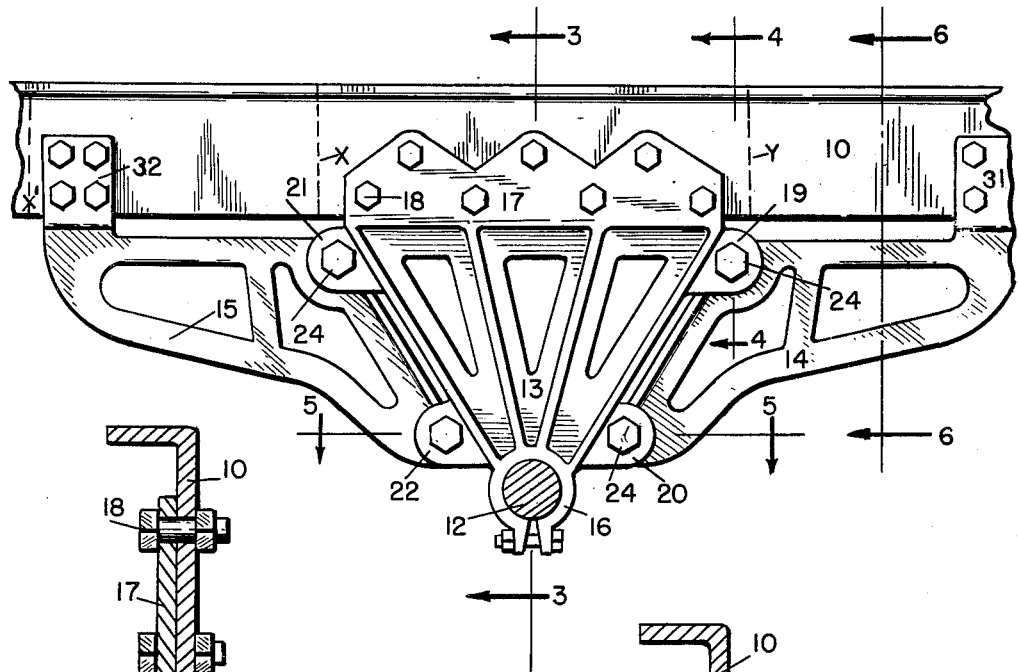
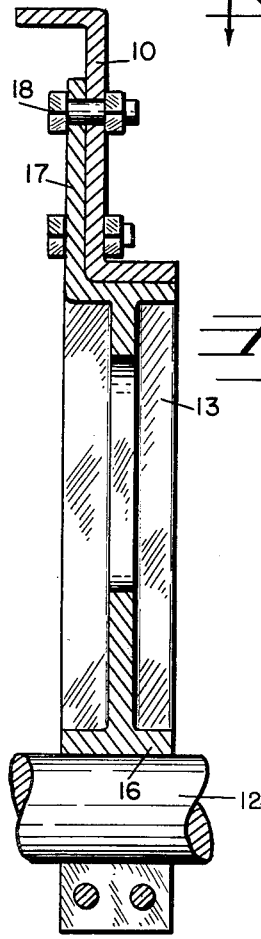
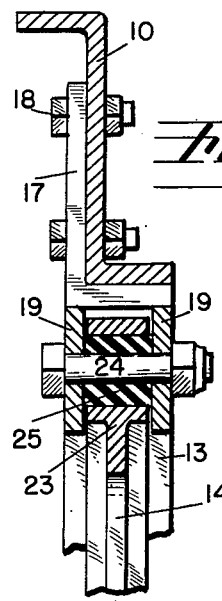
INVENTOR.
ANCEL S. PAGE
BY *F. R. Geisler*
ATTORNEY Patented Mar. 3, 1953

2,630,331

UNITED STATES PATENT OFFICE 2,630,331

SHAFT MOUNTING BRACKET FOR HEAVY VEHICLES

Ancel S. Page, Portland, Oreg.

Application September 17, 1951, Serial No. 246,902

5 Claims. (Cl. 280—104.5)

1

This invention relates to running gear suspension for vehicles, particularly heavy duty trucks and trailers, and more specifically to the means by which the wheel axles and trunnion shafts of the running gear for such vehicles are connected to the main frame of the vehicle.

This invention relates especially to the so-called dual axle type of vehicles wherein the dual axles for the wheels are mounted on walking beams which in turn are mounted on trunnion shafts. Brackets of one kind or another, secured to the vehicle frame at the respective sides of the vehicle, provide the trunnion shaft mounting. It is customary for such mounting brackets to be rigidly secured to main longitudinal vehicle frame members. In heavy duty dual axle trucks and trailers, especially trucks and trailers employed in logging operations, the strain on the longitudinal frame members, to which members the mounting brackets are rigidly attached, not infrequently results in failures, in the form of breaks or cracks, developing in the longitudinal frame members, necessitating the replacement of such members. The replacing of main frame members involves considerable expense in labor and material as well as the temporary loss of the use of the vehicle.

Since the longitudinal frame members of such vehicles, regardless of the size and strength of the frame members, are never absolutely rigid, some slight flexing of these members occurs under heavy loads on rough roads, and this slight flexing and straining, when continued over a period of time, may result finally in the breaking or cracking of the frame member, and, in heavy duty log trucks and trailers, this frequently occurs.

An object of this invention is to reduce, if not entirely eliminate, the tendency for such breaks or cracks to occur in the longitudinal frame members to which the brackets for the running gear mounting are attached.

Another object of the invention is to provide an improved mounting bracket for the trunnion shaft in dual axle vehicles which will act to relieve the strain on the vehicle frame members at the places where such breaks in the frame members are most likely to occur.

A further object of the invention is to provide a mounting bracket for trunnion shafts and the like which will have sufficient flexibility to prevent any fracturing of the bracket while at the same time reducing the customary strain on the longitudinal frame member to which the bracket is secured.

2

An additional specific object is to provide a novel and improved bracket suitable for the purposes mentioned which will not be expensive or difficult to manufacture but which will be simple in construction and which will not result in the addition of any great amount of weight to the over-all weight of the vehicle. In accomplishing these objects I employ a shaft mounting bracket made of separate but connected sections constructed, arranged and functioning as hereinafter briefly described. In the following description reference is made to the accompanying drawings showing a preferred form of my invention, in which drawings:

Fig. 1 is a more or less diagrammatic and fragmentary side elevation of a dual axle truck in which my improved bracket is employed as the mounting for the trunnion shaft on each side of the vehicle, but only the top portion of the mounting bracket is visible behind the walking beam and wheels;

Fig. 2 is a corresponding enlarged fragmentary side elevation of the same vehicle with the walking beam assembly, wheel axles and wheels entirely removed so as to give an unobstructed side elevation of the trunnion shaft mounting bracket;

Figs. 3 and 4 are enlarged fragmentary vertical transverse sections on lines 3—3 and 4—4 of Fig. 2;

Fig. 5 is an enlarged plan section on the line 5—5 of Fig. 2; and

Fig. 6 is a transverse sectional elevation taken on line 6—6 of Fig. 2, but drawn to a reduced scale, the walking beam assemblies and the wheels and axles of the vehicle suspension being omitted.

In the drawings 10 indicates a main longitudinally-extending frame member for the vehicle body or chassis, located as is customary, at one side of the vehicle body, a similar main frame member being understood to be located at the opposite side of the vehicle. It is to be assumed that the vehicle illustrated in part in Fig.1 is a heavy duty vehicle, the platform, upper section, or superstructure of the vehicle being omitted from the figure. Such a vehicle as that illustrated in part in Fig. 1, is also commonly known as a dual axle vehicle due to the fact that the body of the vehicle is mounted on a pair of axles and corresponding wheels instead of on a single axle and wheels. With such vehicle suspension the dual axles are mounted on a pair of walking beams at each side of the vehicle, the walking beams in turn being pivotally mounted on a transversely-extending trunnion shaft. The walking beam shown in part in Fig. 1 is designated as a whole by the reference character 11 and is a composite spring type walking beam of well known construction which need not be described further inasmuch as it does not constitute any part of the present invention. This walking beam and a similar one (not shown) on the opposite side of the vehicle are pivotally mounted on the trunnion shaft 12.

As previously mentioned, it is customary in a vehicle suspension of this type for the trunnion shaft 12 to be rigidly supported in a pair of mounting brackets which extend downwardly from the main longitudinal frame members at opposite sides of the vehicle and which are rigidly secured to the respective main frame members.

Referring now to Fig. 2, my improved bracket mounting for the trunnion shaft 12 at each side of the vehicle comprises a composite bracket including a central triangular-shaped main portion 13 and a pair of end extensions 14 and 15. The central main portion 13 in general resembles some of the trunnion shaft brackets heretofore commonly used and is formed with a split shaft-clamping sleeve 16 at the bottom. At the top this main portion 13 is formed with a shoulder and upstanding flange 17 (see also Figs. 3 and 4) to enable the main bracket to be rigidly secured to the longitudinal frame member 10. The main longitudinal frame members of the vehicle may be of any of the conventional types of beams and the top of the trunnion bracket would be formed accordingly so as to enable the bracket to be rigidly secured to a frame member, for example, by bolts or by welding. The longitudinal frame member 10 as illustrated (Figs. 3 and 4) is in the form of a Z beam and the bracket main portion 13 is shown secured to the frame member by bolts 18.

The extensions 14 and 15, preferably shaped substantially in the form of an obtuse triangle, have shoulders and upstanding flanges 31 and 32 respectively at their upper outer ends, which flanges similarly are firmly bolted to the frame member 10. The side ends of the central main portion 13 are formed with two pairs of ears 19, 20 and 21, 22 at the top and bottom of the bracket respectively, and the extensions 14 and 15 are formed with bosses 23 (Figs. 4 and 5) adapted to be received within these pairs of ears. Coupling pins or bolts 24 extend through the pairs of ears of the main portion 13 and the interposed bosses 23 of the extensions 14 and 15 so as to provide a pair of coupling bolts between each of the extensions 14 and 15 and the adjacent end of the main central portion 13.

The holes through the bosses 23 for the coupling bolts 24, as shown in Figs. 4 and 5, are of larger diameter than the coupling bolts in order to accommodate a resilient bushing 25, of rubber or other material suitable for resilient bushings. Thus each extension 14 or 15 is rigidly secured to the vehicle frame member 10 at the outer end while being secured to the adjacent end of the same central portion of the composite bracket by slightly flexible coupling joints. The reason for this will be presently explained.

When a rigid integral bracket, rigidly attached to a main frame member, provides the entire mounting for the trunnion shaft at each side of the vehicle, the slight flexing of the main frame member under heavy loads and stresses, previously mentioned, will often eventually result in the cracking or breaking of the frame member. I have found that such breaking invariably occurs in the frame member near one end or the other of the rigidly attached trunnion bracket. Thus assuming that a trunnion bracket is in the shape of the central main portion 13 (Fig. 2) without the extension 14 or 15, a break in the main frame member 10 from the causes described would then occur either at the point indicated by the broken line $x$ or by the broken line $y$ in Fig. 2, the break being most likely to occur in that section of the frame member which is the longer.

Further I have found that merely lengthening the rigid trunnion bracket does not solve the difficulty. Thus, when I have made corresponding tests with a rigid integral trunnion bracket of a length corresponding to that of my composite bracket of Fig. 2, I have found that similar breaks would then eventually occur near one end or the other of the rigid bracket, as for example at the point indicated by $x'$ in Fig. 2. With my improved composite bracket I have found that a similar frame member under similar conditions of testing will endure considerably greater strains or stresses over a considerably longer period without showing any tendency to crack or break.

This I attribute to the fact that the extensions 14 or 15 do not attempt the impossibility of preventing all flexing whatsoever of the frame member but do allow a slight flexing to occur in the frame member between the mounting of the central main portion 13 and the spaced outer connection between the extension and the frame member. At the same time each extension serves as a reinforcement in aiding to restrain and minimize the necessary flexing of the member.

When the trunnion shaft is mounted near the rear end of the vehicle a single extension on the forward end of the main portion 13 may suffice, also my composite bracket can be used satisfactorily if only one of the two coupling joints by which the extension is connected to the main portion 13, preferably the lower joint, is provided with a resilient bushing permitting the flexibility. However I consider it preferable to have both of the coupled joints with the extension member made slightly flexible in the manner described.

I claim:

1. In a vehicle having a pair of main longitudinally-extending frame members at opposite sides, a composite shaft-mounting bracket rigidly secured to and depending from each of said main frame members and located in the same substantially vertical plane with the respective frame member, each composite bracket comprising a central main portion, a sleeve at the bottom of said main portion for mounting one end of a transverse shaft, the ends of said main portion converging towards said sleeve, an extension attached to each end of said main portion and extending in the same plane with said main portion and said frame member, each extension rigidly secured to said frame member at a point a substantial distance beyond the adjacent end of said main bracket portion, each extension coupled to the adjacent end of said main bracket portion by a pair of coupling joints at the top and bottom of said main portion respectively, a coupling pin included in each of said coupling joints, and a resilient sleeve bushing surrounding the coupling pins in said bottom coupling joints, whereby each of said extensions will permit a slight flexing of the vehicle frame member to take place between said main bracket portion and the point where the extension is secured to the frame member, while acting as a reinforcement and restraint against excessive flexing of the frame member.

2. In a vehicle, a pair of main longitudinally-extending frame members at opposite sides, a composite trunnion shaft bracket secured to and depending from each of said main frame members and located in the same substantially vertical plane with the respective frame member, each trunnion shaft bracket including a substantially triangular-shaped main portion, clamping means at the bottom of said main portion for securing one end of the trunnion shaft, an extension attached to one end of said main portion and extending in the same plane with said main portion and said frame member, said extension being substantially triangular-shaped, said extension secured to said frame member at a point a substantial distance beyond said main bracket portion, said extension coupled to said main bracket portion by a pair of coupling joints at the top and bottom of said main portion respectively, a coupling pin included in each of said coupling joints, and a resilient sleeve bushing surrounding each of said coupling pins, whereby said extension will permit a slight flexing of the vehicle frame member to take place between said main bracket portion and the point where the extension is secured to the frame member, while acting as a reinforcement and restraint against excessive flexing of the frame member.

3. In a vehicle, a pair of main longitudinally-extending frame members at opposite sides, a composite trunnion shaft bracket rigidly secured to and depending from each of said main frame members and located in the same substantially vertical plane with the respective frame member, each trunnion shaft bracket comprising a central integral main portion, a sleeve at the center of the bottom of said main portion for holding one end of the trunnion shaft, the ends of said main portion converging towards said sleeve, an extension attached to each end of said main portion and extending in the same plane with said main portion and said frame member, said extensions being substantially in the shape of an obtuse triangle, each extension rigidly secured to said frame member at a point a substantial distance beyond the adjacent end of said main bracket portion, each extension coupled to the adjacent end of said main bracket portion by a pair of coupling joints at the top and bottom of said main portion respectively, a coupling pin included in each of said coupling joints, and a resilient sleeve bushing surrounding the coupling pins in said bottom coupling joints, whereby each of said extensions will permit a slight flexing of the vehicle frame member to take place between said main bracket portion and the point where the extension is secured to the frame member, while acting as a reinforcement and restraint against excessive flexing of the frame member.

4. In a vehicle, a pair of main longitudinally-extending frame members at opposite sides, a composite trunnion shaft bracket rigidly secured to and depending from each of said main frame members and located in the same substantially vertical plane with the respective frame member, each trunnion shaft bracket comprising a central integral substantially triangular-shaped main portion, a clamping sleeve at the center of the bottom of said main portion for securing one end of the trunnion shaft, an extension attached to each end of said main portion and extending in the same plane with said main portion and said frame member, said extensions being substantially in the shape of an obtuse triangle, each extension rigidly secured to said frame member at a point a substantial distance beyond the adjacent end of said main bracket portion, each extension coupled to the adjacent end of said main bracket portion by a pair of coupling joints at the top and bottom of said main portion respectively, a coupling pin included in each of said coupling joints, and a resilient sleeve bushing surrounding each of said coupling pins, whereby each of said extensions will permit a slight flexing of the vehicle frame member to take place between said main bracket portion and the point where the extension is secured to the frame member, while acting as a reinforcement and restraint against excessive flexing of the frame member.

5. In a vehicle having a pair of main longitudinally-extending frame members at opposite sides, a composite shaft-mounting bracket rigidly secured to and depending from each of said main frame members and located in the same substantially vertical plane with the respective frame member, each composite bracket including a main portion, means at the bottom of said main portion for mounting one end of a transverse shaft, an extension attached to one end of said main portion and extending in the same plane with said main portion and said frame member, the extremity of said extension rigidly secured to said frame member at a point a substantial distance beyond said main bracket portion, said extension coupled to said main bracket portion by a pair of coupling joints at the top of said main bracket portion near said frame member and at the bottom of said main portion near said shaft respectively, resilient means included in one of said coupling joints to enable said extremity of said extension to move slightly up or down with respect to said main bracket portion, whereby said extension will permit a slight flexing of the vehicle frame member to take place between said main bracket portion and said extremity of said extension where the extension is secured to the frame member but will act to restrain such flexing of the frame member beyond that provided for by said resilient means.

ANCEL S. PAGE.

REFERENCES CITED

The following references are of record in the file of this patent:

UNITED STATES PATENTS

| Number | Name | Date |
|---|---|---|
| 1,746,082 | Kegresse | Feb. 4, 1930 |

FOREIGN PATENTS

| Number | Country | Date |
|---|---|---|
| 280,047 | Great Britain | Nov. 10, 1927 |